(12) United States Patent
Kuffel

(10) Patent No.: US 10,342,331 B2
(45) Date of Patent: Jul. 9, 2019

(54) COLLAPSIBLE ARTICULATING CABINET FRAME

(71) Applicant: Panduit Corp., Tinley Park, IL (US)

(72) Inventor: Gregory L. Kuffel, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/920,724

(22) Filed: Mar. 14, 2018

(65) Prior Publication Data

US 2018/0263367 A1 Sep. 20, 2018

Related U.S. Application Data

(60) Provisional application No. 62/472,272, filed on Mar. 16, 2017.

(51) Int. Cl.
*A47B 43/00* (2006.01)
*A47B 47/00* (2006.01)
*B60B 33/00* (2006.01)

(52) U.S. Cl.
CPC .............. *A47B 43/00* (2013.01); *A47B 47/00* (2013.01); *B60B 33/00* (2013.01)

(58) Field of Classification Search
CPC . A47B 43/00; D06F 57/08; A47F 5/10; A47F 5/108
USPC ......................................... 211/201, 149, 195
See application file for complete search history.

(56) References Cited

U.S. PATENT DOCUMENTS

| | | |
|---|---|---|
| 2,576,750 A | 11/1951 | Clark |
| 3,061,396 A | 10/1962 | Hock |
| 4,579,401 A * | 4/1986 | Mears ................. A47B 43/00 312/258 |
| 5,593,046 A | 1/1997 | Katsuura et al. |
| 5,664,854 A | 9/1997 | Letch |
| 6,848,758 B1 | 2/2005 | Yeh et al. |
| 7,293,666 B2 | 11/2007 | Mattlin et al. |
| 7,472,970 B2 | 1/2009 | Bergesch et al. |
| 8,033,406 B2 | 10/2011 | Mattlin et al. |
| 8,079,481 B2 | 12/2011 | Canfield et al. |
| 8,210,490 B2 | 7/2012 | Mattlin et al. |
| 8,353,492 B2 | 1/2013 | Mattlin et al. |
| 8,363,998 B2 | 1/2013 | Newman et al. |
| 8,413,827 B2 | 4/2013 | Taylor |
| 8,528,872 B2 | 9/2013 | Mattlin et al. |

(Continued)

FOREIGN PATENT DOCUMENTS

| | | |
|---|---|---|
| GB | 2286337 A | 8/1995 |
| WO | 2012104697 A2 | 8/2012 |

*Primary Examiner* — Matthew W Ing

(74) *Attorney, Agent, or Firm* — Christopher S. Clancy; James H. Williams; Ainee E. McVady

(57) ABSTRACT

A collapsible cabinet frame articulates between a collapsed form and an expanded form. The collapsible cabinet form includes a first side frame with front corner posts, rear corner posts, and a plurality of front to back beams extending between the front corner post and the rear corner post. A second side frame with front corner posts, rear corner posts, and a plurality of front to back beams extending between the front corner post and the rear corner post. A front upper side to side beam and a front lower side to side beam are hingedly connected to the first side frame and the second side frame. A rear upper side to side beam and a rear lower side to side beam are hingedly connected the first side frame and the second side frame.

8 Claims, 6 Drawing Sheets

(56) References Cited

U.S. PATENT DOCUMENTS

| | | |
|---|---|---|
| 9,307,836 B2 | 4/2016 | Arflack et al. |
| 2002/0046979 A1 | 4/2002 | Larsen et al. |
| 2004/0238469 A1 | 12/2004 | Ng |
| 2006/0103270 A1* | 5/2006 | Bergesch ................ G06F 1/181 312/223.1 |
| 2006/0108899 A1* | 5/2006 | Jin ......................... A47B 43/00 312/257.1 |
| 2011/0042910 A1 | 2/2011 | Ceballos-Godefroy |
| 2011/0115350 A1 | 5/2011 | Tsai et al. |
| 2013/0213907 A1* | 8/2013 | Masse ................. H05K 5/0217 211/26 |
| 2015/0225004 A1 | 8/2015 | Dunford |
| 2016/0037913 A1* | 2/2016 | Franck .................. A47B 57/20 211/208 |

* cited by examiner

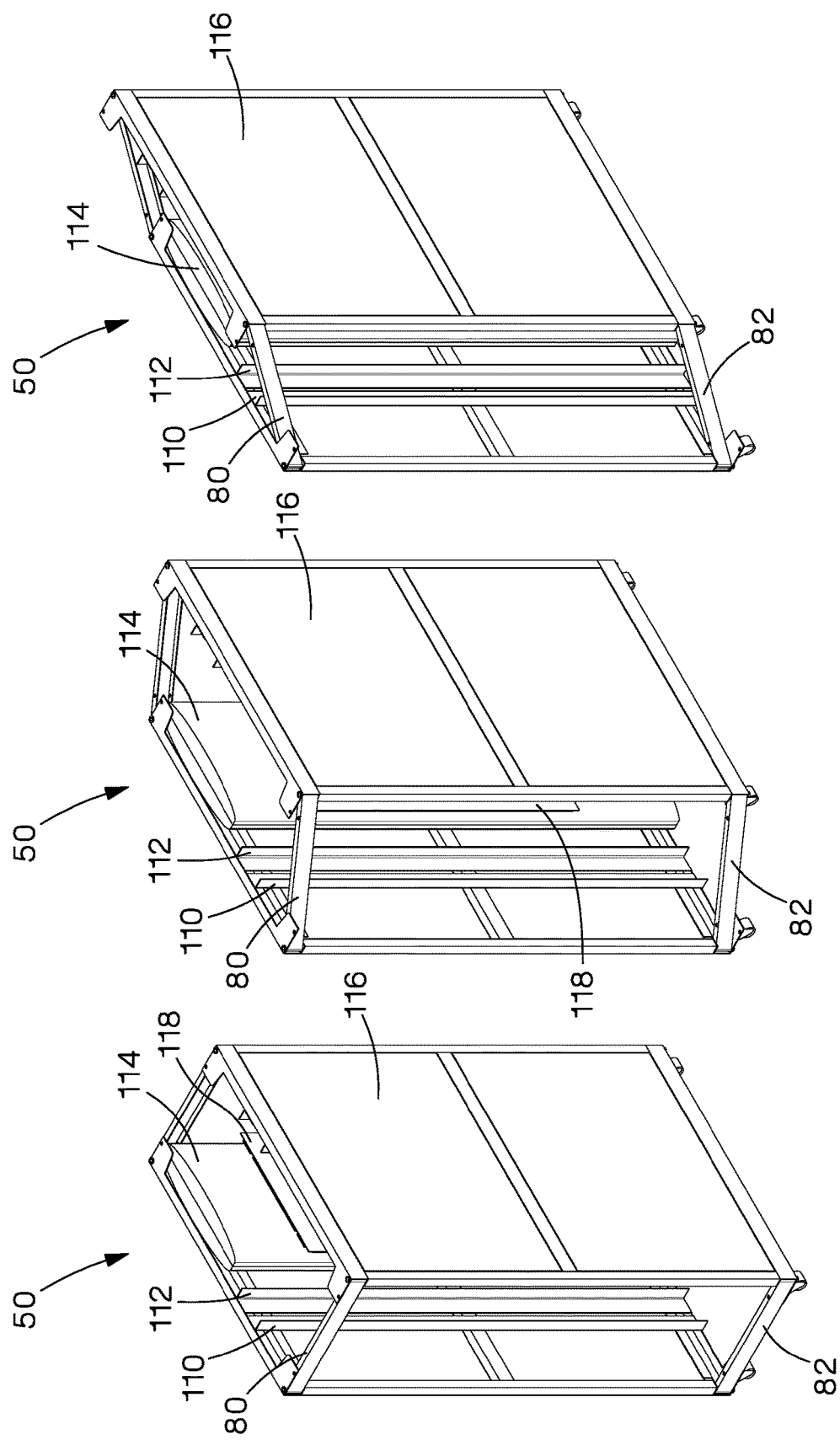

COLLAPSIBLE ARTICULATING CABINET FRAME

CROSS-REFERENCE TO RELATED APPLICATIONS

This application claims priority to U.S. Provisional Application No. 62/472,272, filed Mar. 16, 2017, the subject matter of which is hereby incorporated by reference in its entirety.

FIELD OF THE INVENTION

The present invention relates to a cabinet frame assembly, and more particularly to a collapsible articulating cabinet frame assembly.

BACKGROUND OF THE INVENTION

The cost to ship cabinets is very high because they consume a large amount of space which limits the quantity that can be placed in a truck or shipping container. Since shipping charges are often based on the truck or container load, being able to place more cabinets in a container helps to reduce cost. One method being deployed today to increase container load quantity is the use of flat packs configurations. FIGS. 6A-6C illustrated flat pack configurations. Cabinets are packaged and shipped unassembled, individually or in bulk to improve space efficiency by reducing the volume each unit occupies. The cabinets are then assembled in the supplier's factory, at a reseller or distributor, or the job site. Using this method, container loads can roughly be doubled. Typically, 36 fully assembled standard configuration cabinets can fit into a 40-foot shipping container. However, using a flat pack solution, 77 units would be able to fit into a 40-foot shipping container.

Although flat pack configurations for cabinets has reduced shipping costs, it is still desirable to further reduce shipping costs. It is also desirable to provide cabinets that are easily and economically assembled after shipping.

SUMMARY OF THE INVENTION

A collapsible cabinet frame designed to articulate between a collapsible form and an expanded form. The collapsible cabinet frame includes a first side frame and a second side frame. The first side frame and the second side frame each include a front corner post, a rear corner post, and a plurality of front to back beams extending between the front corner post and the rear corner post. A front upper side to side beam and a front lower side to side beam are hingedly connected and positioned between the first side flame and the second side frame. A rear upper side to side beam and a rear lower side to side beam are hingedly connected and positioned between the first side frame and the second side frame.

BRIEF DESCRIPTION OF THE DRAWINGS

FIG. 1A is a perspective view of a cabinet frame of the present invention in a standard configuration with doors, equipment rails, top cap, and other hardware shown inside the cabinet for shipping.

FIG. 1B is a perspective view of the cabinet frame of FIG. 1A in a partially collapsed configuration.

FIG. 1C is a perspective view of the cabinet frame of FIG. 1A in a collapsed configuration.

DETAILED DESCRIPTION

Figure 2A:
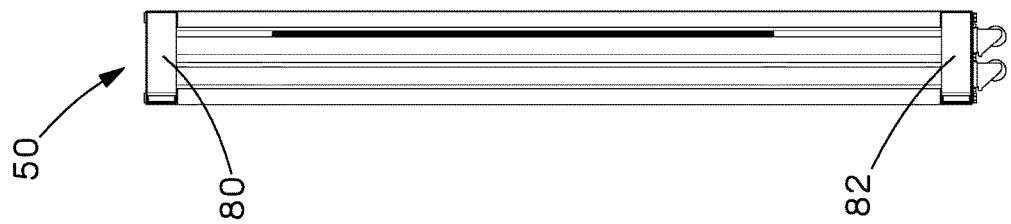
FIG. 2A is a front view of the cabinet frame of FIG. 1A.
Figure 2B:
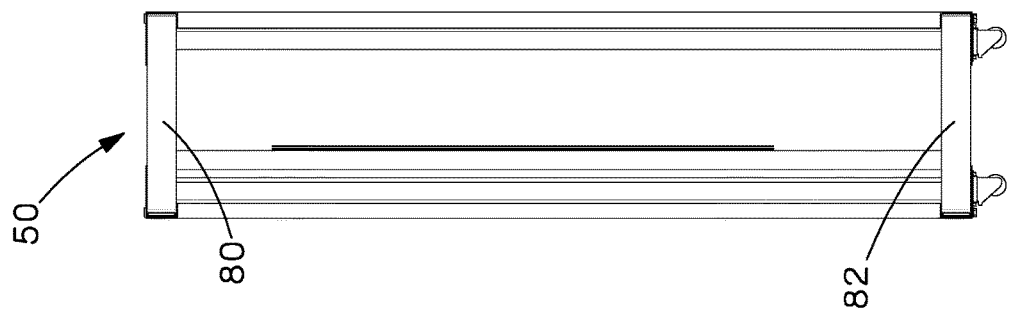
FIG. 2B is a front view of the cabinet frame of FIG. 1B.
Figure 2C:
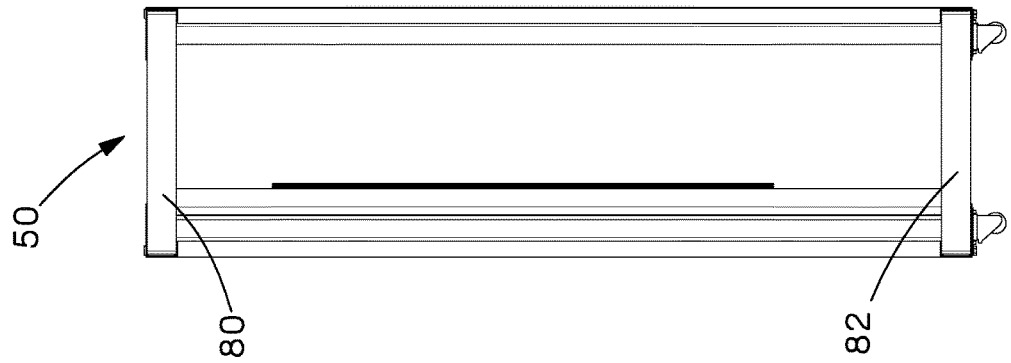
FIG. 2C is a front view of the cabinet frame of FIG. 1C.

The present invention is a collapsible cabinet frame 50 that is easily articulated between a collapsed form to an expanded form. FIG. 1A and 2A illustrate the cabinet frame of the present invention fully expanded. FIGS. 1B and 2B illustrate the cabinet frame being partially collapsed. FIGS. 1C and 2C illustrate the cabinet frame fully collapsed. As described below, the doors, top cap, bottom cover, equipment rails, and various accessories hardware are positioned inside the cabinet frame for protection while allowing the cabinet frame to collapse for improved shipping and handling. Note, these items can also be positioned outside of the cabinet interior, if needed.

Figure 3:
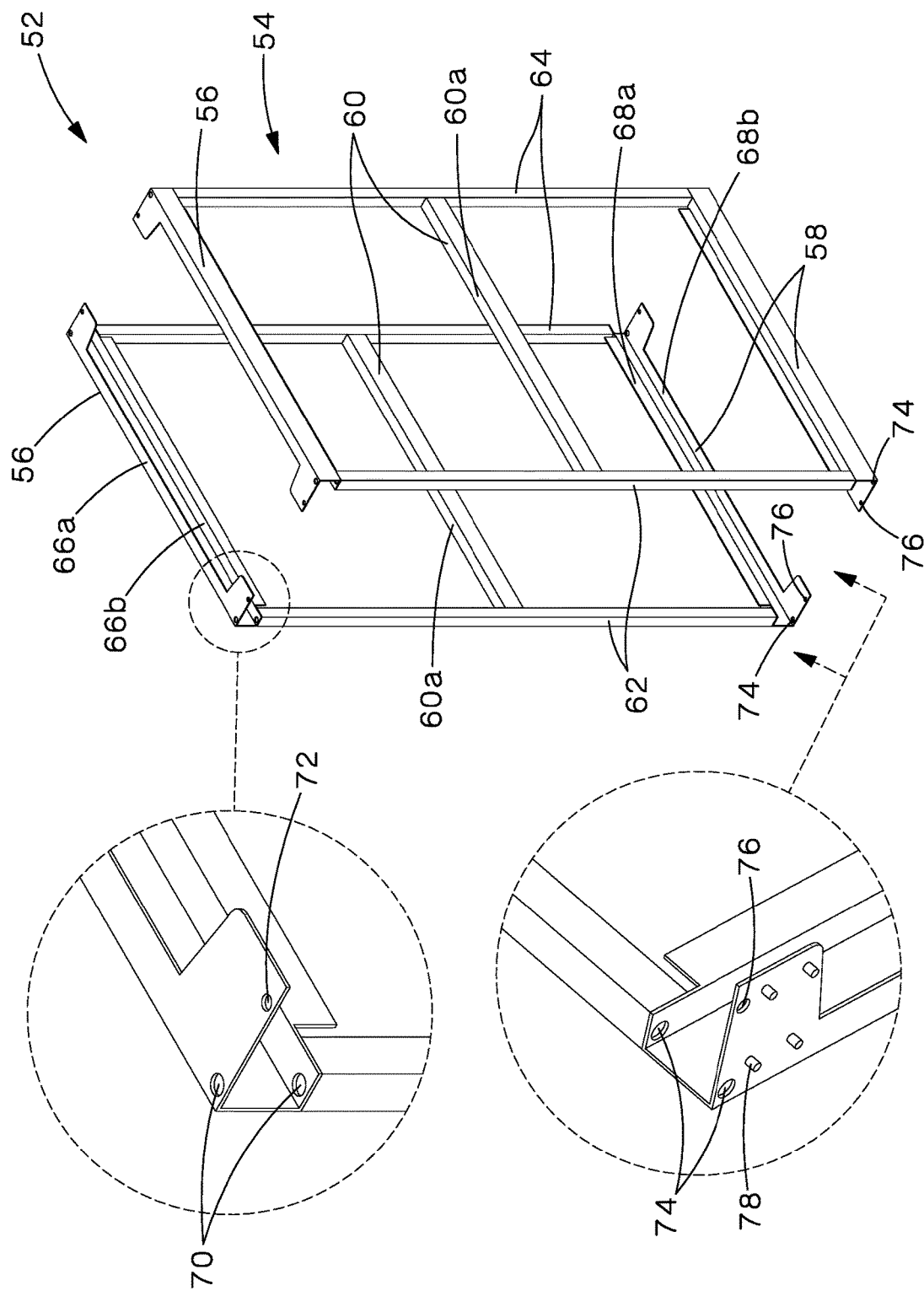
FIG. 3 is a partially exploded view of the side frame assembly that forms the cabinet frame of FIG. 1A.

FIG. 3 illustrates the side frame assembly 52 of the cabinet frame 50. The cabinet assembly 50 has two side frames 54. Each side frame 54 includes an upper front to back beam 56, a lower front to back beam 58, a middle front to back beam 60, a front corner post 62, and a rear corner post 64. Each upper front to back beam 56 and each lower front to back beam 58 include e-rail mounting flanges 66b and 68a, respectively. Each middle front to back beam 60 includes e-rail mounting flange 60a. The upper front to back beams 56 and the lower front to back beams 58 also include hinge pin guide holes 70, 74 and pin holes 72, 76, respectively. The lower front to back beam 58 includes threaded caster mounting posts 78.

The side frame(s) 54 are generally assembled as follows. The front corner post 62 is fastened to the lower front to back beam 58 such that the end of the post 62 is positioned over the front to back beam hinge pin guide hole 74. This can be done by welding or other means. Next, the rear corner post 64 is fastened to the rear portion of the lower front to back beam 58. The upper front to back beam 56 is fastened to the front and rear corner posts 62, 64 in the same manner as the lower front to back beam 58. The middle front to back beam 60 is then assembled to the front and rear corner posts 62. 64 midspan by welding or other means.

Figure 4:
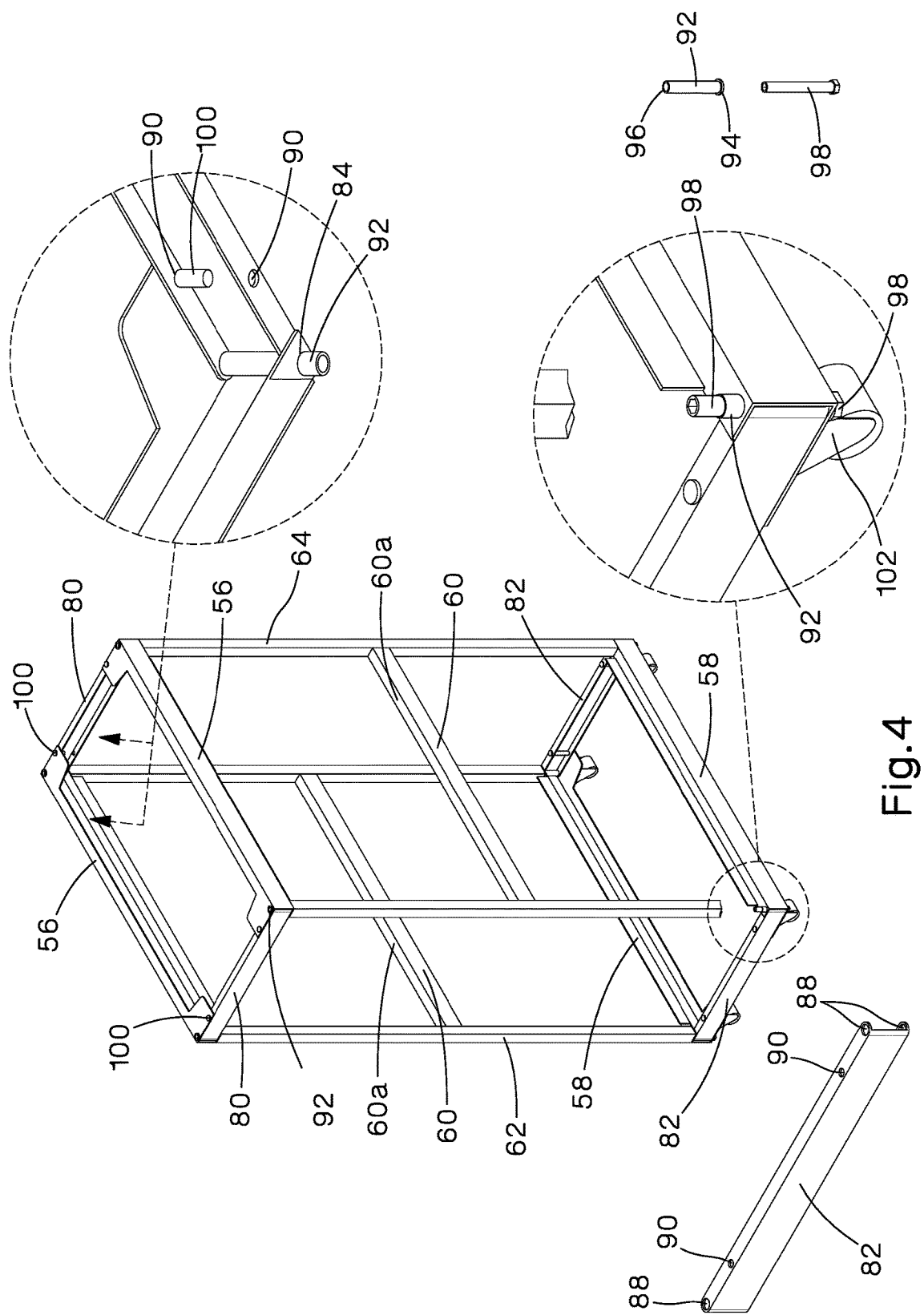
FIG. 4 is a partially exploded view of the side frame assembly of FIG. 3 with side to side beams and hinges.

FIG. 4 illustrates the two side frames 54 joined together by upper side to side beams 80 and lower side to side beams 82. The upper side to side beams 80 and the lower side to side beams 82 include hinge pin guide holes 84, 88 and locking pin holes 86, 90, respectively. One end of the front lower side to side beam 82 is placed between the flanges 68a, 68b of the lower front to back beam 58 with the lower front to back beam hinge pin guide hole 74 and the side to side beam hinge pin guide hole 88 being aligned. A hinge pin 92 is inserted through the holes until the hinge pin flange 94 touches the bottom flange 68b of the lower front to back beam 58. The hinge pin flange 94 is then welded or fastened to the bottom flange 68b of the lower front to back beam 58 to retain the hinge pin 92. The holes 84, 88 will be sized to allow the lower front to back beam 58 and the side to side beam 82 to rotate or hinge in a precise well controlled manner relative to each other. This process is repeated at the remaining seven corners. About the upper front to back beams 56, the hinge pin flange 94 will touch the top flange 66a of the upper front to back beams 56 instead of the bottom flange 66b.

Alternatively, the hinge pin may be press fit into the lower front to back beam pin holes to retain the hinge pin or the pin can be pressed into the side to side beam holes to retain the hinge pin. In either case, the holes will have some clearance relative to the pin's outside diameter and will act as a precise bearing in situ with the pin to create a hinge point.

A threaded leveling leg 98 is threaded into the lower hinge pin threaded bore 96. This is repeated on the remaining lower corners of the cabinet frame. A caster 102 is mounted with nuts to the lower flange of the lower front to back beam using caster threaded muffling posts 78. This is repeated at the remaining lower corners of the cabinet frame.

Figure 5:
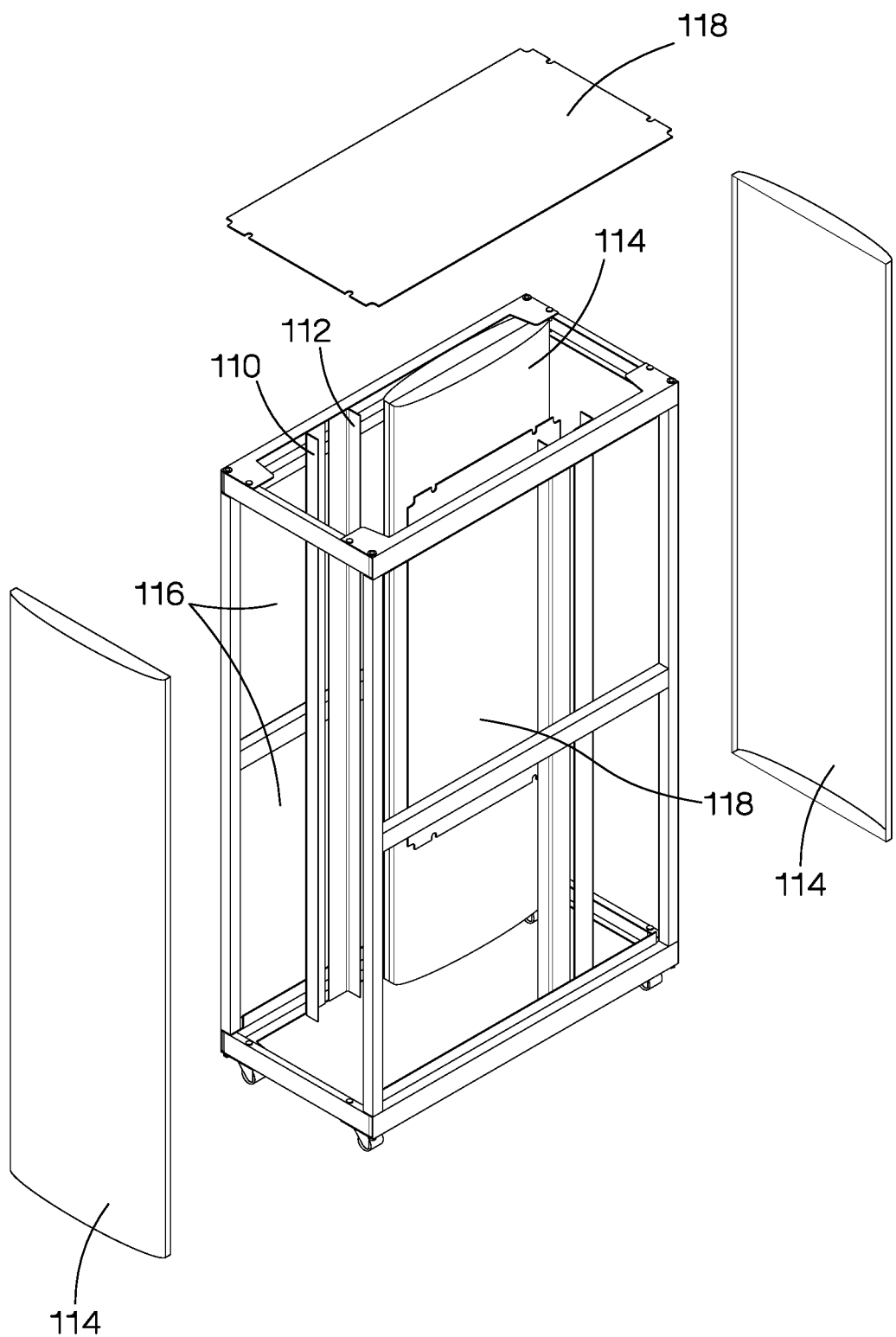
FIG. 5 is a partially exploded view of the cabinet frame, doors, and top cap of FIG. 1A.
Figure 6A:
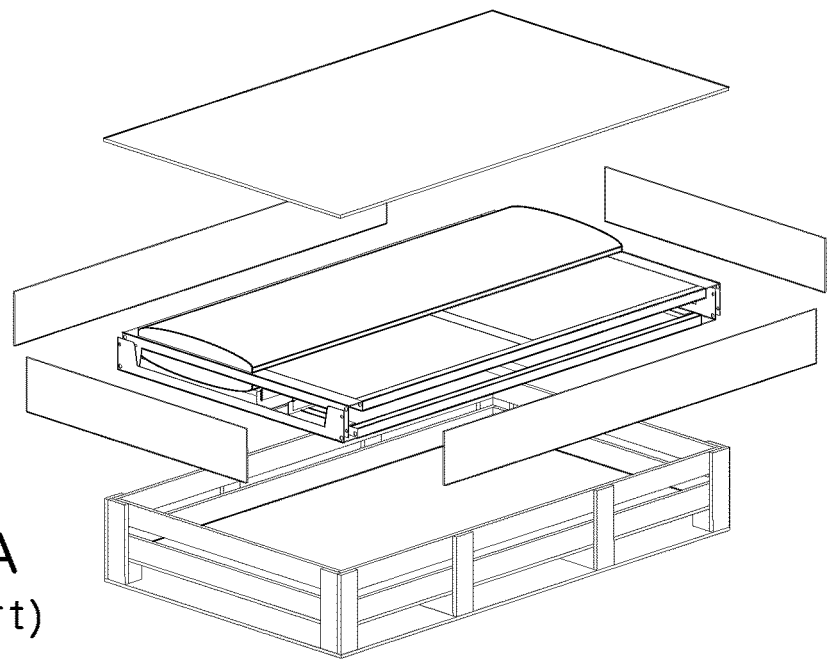
FIG. 6A is an exploded view of the prior art cabinet frame being flat packaged.
Figure 6B:
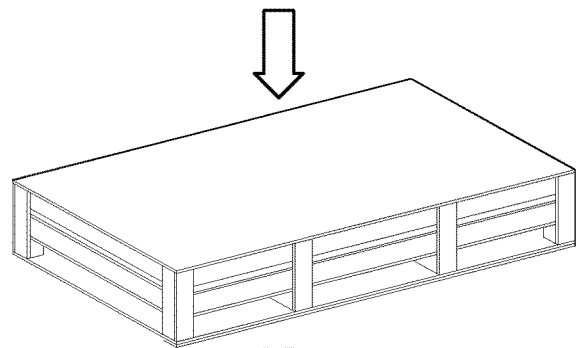
FIG. 6B is a perspective view of the prior art flat packed cabinet frame assembly of FIG. 6A.
Figure 6C:
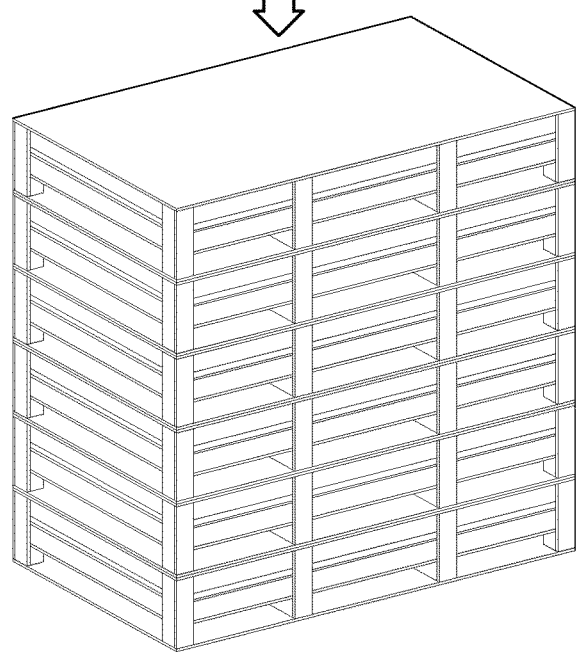
FIG. 6C is a perspective view of numerous prior art flat packed cabinet frames of FIG. 6b.

FIG. 5 illustrates an assembled cabinet with the equipment rails 110, 112, doors 114, top cap 118, and hardware positioned within the cabinet. Two side panels 116 are also shown. The front and rear equipment rails 110, 112 can be mounted to the upper, lower, and middle front to back beams in locations that will allow the cabinet frame to collapse as much as possible without damage to the cabinet frame or accessories contained within during shipping and handling.

In preparing the cabinet frame for shipping, the doors 114, top cap 118, bottom cover (not illustrated), and accessory hardware are positioned and secured inside the cabinet frame 50 (see FIG. 5). The cabinet frame 50 is then collapsed until the angle between the side to side and front to back beams is significantly less than 90 degrees, without damaging the items contained therein. Stop points are incorporated into the cabinet design or the packaging to prevent over collapsing and provide support. The cabinet frame 50 is now ready to be packaged.

The packaging will generally be wrapped around the collapsed cabinet frame with additional protection for the top and bottom of the cabinet frame. The packaging material can be corrugated cardboard or other suitable material. The packaging is unique in that it is designed to protect the collapsed cabinet frame during shipment can be reused on the cabinet after it has been expanded. This is beneficial to resellers who plan to expand and assemble cabinets in their facility prior to passing them on to their customers. This will save the expense of buying their own packaging solution.

Once the cabinet frame 50 has arrived at the assembly site, the cabinet frame 50 is erected based on the following steps. First the packaging is removed and the doors 114, top cap 118, bottom cover (not illustrated), and accessory hardware are put aside in a safe location. Next, the cabinet frame 50 is expanded until the side to side beams 80, 82 and the front to back beams 56, 58. 60 are at a 90-degree a angle to each other. A locking screw, bolt pin or other fastening device 100 is then placed into one of the lower front to back beam locking pin holes 76 and the corresponding side beam locking pin hole 90. This process is repeated for the remaining seven hole locations.

At this point, the cabinet frame 50 is square, rigid and secure. It can no longer collapse. The equipment rails 110, 112 are unmounted, moved, and remounted in the desired location to accommodate the equipment deployed. The top cap 118 is mounted to the upper front to back beams 56 and the upper side to side beams 80 via fasteners. The optional bottom cover (not illustrated) would be mounted to the lower front to back beams 58 and the lower side to side beams 82 using fasteners. Finally, the front and rear doors 114 are mounted to the front and rear of the cabinet frame 50. The side panels 116 were pre-installed.

To those familiar in the art, alternate frame constructions are possible to achieve the function and benefits associated with the embodiment described. In keeping with the benefits of this invention, the collapsible cabinet frame can be constructed in several ways. For example, the door frame can be assembled as a front and back frame that is then hingeably attached to the front to back beams.

Alternately, while this embodiment incorporates eight hinge points located at the corner of the cabinet, additional hinge points and or a telescoping beam configuration can be deployed to collapse the sides of the frame to reduce its footprint for shipping. For example, the front to back and side to side beam components may be configured as two or more pieces and can be designed to interact in a controlled telescoping manner to reduce the footprint of the frame. Also, hinge points deployed within the length of the front to back and side to side beams interacting with hinge points at the ends of these components can also be used to collapse the beams and reduce the footprint of the frame.

Another example, rather than incorporating features into the front to back and side to side beams that work together to create the hinge points of the frame, the hinges/hinge points could be produced as standalone components that would be secured to alternate configurations of the front to back and side to side beams to create the same function and benefits. The packaging configuration can also be altered from that described while still utilizing the benefits of the collapsible frame.

The collapsible frame of the present invention offers several benefits and solutions to problems cabinet manufactures and resellers face. First, the collapsible cabinet frame enables shipping costs to be reduced. The shipping configuration of the collapsed cabinet frame is much smaller than standard non-collapsing cabinets. For example, a standard cabinet is 600 mm wide by 1200 mm deep by 42 RU tall. This cabinet is typically 598 mm wide ×1269 mm deep ×2026 mm tall with the doors mounted thereto. The volume of the cabinet is 1.537 cubic meters. This sized cabinet when collapsed has the dimensions 224 mm wide ×1733 mm deep ×2026 mm tall. The volume of the collapsible cabinet frame is 0.786 cubic meters which is 51% less than the volume of a standard cabinet. Thus, shipping costs per unit will be decreased, which will provide saving benefits throughout the supply chain.

The collapsible cabinet frame also reduces the cabinet storage area space at a warehouse or job site. The smaller collapsible cabinet frame footprint allows cabinets to be stored on site while minimizing obstructions. Additionally, by reducing the footprint of the cabinet frame, the distributor reseller may be more inclined to stock cabinets on site in support of discretionary business.

The collapsed cabinet frame is largely preassembled from the factory. As described above, to assemble the cabinet, the cabinet frame is expanded, locking pins are installed, the equipment rails are adjusted, the top cap is installed and then the doors are hung. It is estimated that this process would take two individuals 10-15 minutes to complete. In contrast, a flat pack cabinet frame arrives with a plurality of pieces or components, e.g. side frames, side to side beams, front to back beams, casters, etc., that must be assembled. Assembling the cabinet takes two individuals between 15 to 40 minutes, depending on the individual's skill level. The reduction in assembly time of the collapsible cabinet reduces labor costs which make it more economical and inviting for resellers, distributors, contractors, or end users to install.

Because the collapsed cabinet frame is largely pre-assembled and requires only a few basic assembly operations, the skill and experience level of the individuals necessary to assemble the cabinet frame quickly is less critical versus the flat pack option. Individuals that may perform the assembly include factory workers, distributors, contractors, or the end user.

Additionally, the collapsible cabinet frame requires less hardware to manage and keep track of during deployment than flat pack solutions thereby reducing the risk of misplacement or loss. Misplaced or lost hardware components would prevent a cabinet from being assembled properly, The collapsible cabinet frame improves assemble quality and consistency. Flat pack configurations require a considerable amount of mechanical assembly steps that need to be controlled and monitored to ensure that the final assembly is put together correctly and functions as intended. Bolt and screw torque application levels and overall squareness are two such important parameters to be controlled. If torque is not controlled at the job site or reseller, the screws and bolts can potentially be stripped out under tightened leading to complaints of unstable cabinet structures or defective product. Further, it is an ongoing expense for the assembler to control the assembly process as special tools, such as torques wrenches, and ongoing Q.C. checks are necessary to control quality. With the collapsible cabinet frame of the present invention, the control and monitoring are less complex. There are fewer assembly steps since the collapsible cabinet frame is largely preassembled with inherent structural integrity. Expanding the frame and securing it is a simple robust operation.

Another benefit of the collapsible cabinet frame is the reduction in shipping damage. Cabinet damage is a significant problem with standard cabinet configurations. The doors are particularly vulnerable as they are made of light, perforated metal and are attached to the outside of the frame. The doors and other areas of the cabinet can be dented or pierced due to rough handling during shipment by fork trucks, shipping strap application, etc. The top caps are also at risk from shing should a shipping strap be placed over the top of the cabinet. Often a significant amount of packaging is required to adequately protect the cabinet. The shipping configuration of the collapsed cabinet frame places the doors, top cap, and various accessories inside of the frame. This effectively protects the cabinet pieces from external impacts or crush forces during shipment. Further, the reduced width of the collapsible cabinet frame minimizes the frontal area exposed to possible impacts and allows the cabinets to be shipped in bulk formats, e.g., multiple cabinets per pallet or skid, which can provide further protection.

Another benefit is that the collapsible cabinet frame affords resellers with re-packing improvements. Distributors are interested in storing and then assembling flat pack cabinets to support discretionary sales, reduce lead times, and improved service levels. An issue with this model is that the assembled cabinet must be adequately re-packaged with appropriate materials to ensure it gets to the customer in good condition. The procurement of these materials creates an expense for the distributor, one they may not wish to adopt, in terms of the purchasing cost, inventory management, and inventory space. Further, it is unlikely that the distributor will have the capability to design and conduct the proper packaging tests to ensure that the packaging solution is reliable. This leads to potential issues for the cabinet supplier as damage complaints may be assigned to them which could impact the company's reputation should the cabinet be resold under the supplier's own brand name.

The packaging system for the collapsible cabinet frame will mitigate these issues. Since the perimeter of the collapsible cabinet frame in the collapsed and expanded configurations are generally equivalent the same packaging can be used to ship the cabinet in the collapsed, as well as the expanded (standard) configuration. Thus, the distributor does not have to purchase packaging materials, manage packing material inventory, and utilize valuable space for packing materials. This minimizes costs and simplifies the delivery model. The solution is also eco-friendly as the packaging used during the supply chain life cycle will be reduced by roughly half.

Furthermore, while the preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A collapsible cabinet frame for articulating between a collapsed form and an expanded form, the collapsible cabinet frame comprising:
    a first side frame and a second side frame, the first side frame and second side frame each include a front corner post, a rear corner post, and a plurality of front to back beams extending between the front corner post and the rear corner post;
    wherein the plurality of front to back beams includes an upper front to back beam and a lower front to back beam; the upper front to back beams have a top flange with hinge pin guide holes and a bottom flange with hinge pin guide holes; and the lower front to back beams have a top flange with hinge pin guide holes and a bottom flange with hinge pin guide holes;
    a front upper side to side beam and a front lower side to side beam hingedly connected to the first side frame and the second side frame; wherein the front upper side to side beam and the front lower side to side beam include hinge pin guide holes;
    a rear upper side to side beam and a rear lower side to side beam hingedly connected to the first side frame and the second side frame; wherein the rear upper side to side beam and the rear lower side to side beam include hinge pin guide holes;
    wherein the front upper side to side beam and the rear upper side to side beam are positioned between the top flange and the bottom flange of the upper front to back beams of the first side frame and the top flanges and the bottom flange of the upper front to back beams of the second side frame; and the front lower side to side beam and the rear lower side to side beam are positioned between the top flange and the bottom flange of the lower front to back beams of the first side frame and the top flange and the bottom flange of the lower front to back beams of the second side frame;
    wherein the hinge pin guide holes in the upper front to back beams align with the hinge pin guide holes in the upper front side to side beam and the upper rear side to side beam, the aligned hinge pin guide holes receive hinge pins to hingedly connect the upper front to back beams, the upper front side to side beam and the upper rear side to side beam; and wherein the hinge pin guide holes in the lower front to back beams align with the hinge pin guide holes in the lower front side to side beam and the lower rear side to side beam, the aligned hinge pin guide holes receive hinge pins to hingedly connect the lower front to back beams, the lower front side to side beam and the lower rear side to side beam; whereby the hingedly connected beams rotate about the hinge pins to collapse the cabinet frame.

2. The collapsible cabinet frame of claim 1 wherein casters are mounted to the bottom flange of the lower front to back beams.

3. The collapsible cabinet frame of claim 1, wherein the top flange of each upper front to back beam includes locking pin holes; the bottom flange of each lower front to back beam includes locking pin holes; and the side to side beams include locking pin holes at each end, whereby when the cabinet is expanded the locking pin holes of the side to side beams align with the locking pin holes of the upper front to back beams and the lower front to back beams for receiving a fastener to lock the expanded frame.

4. The collapsible cabinet frame of claim 1, wherein the front corner post, the rear corner post and the front to back beams are welded together to form the first side frame and the front corner post, the rear corner post and the front to back beams are welded together to form the second side frame.

5. The collapsible cabinet frame of claim 1, wherein the front upper side to side beam and the front lower side to side beam are positioned between the first side frame and the second side frame; and the rear upper side to side beam and the rear lower side to side beam are positioned between the first side frame and the second side frame.

6. The collapsible cabinet frame of claim 1, wherein the frame further comprising a door positioned between the first side frame and the second side frame; at least one equipment rail secured to one of the front to back beams; and a top cap.

7. The collapsible cabinet frame of claim 6, wherein the door, equipment rails and top cap are capable of being stored inside the cabinet frame while in the collapsed form for shipping.

8. The collapsible cabinet frame of claim 1, wherein the frame is capable of being rotated from a collapsible form to an expanded form.

* * * * *